US008140012B1

(12) United States Patent
Causey et al.

(10) Patent No.: US 8,140,012 B1

(45) Date of Patent: Mar. 20, 2012

(54) BLUETOOTH SECURITY PROFILE

(75) Inventors: Mark Edward Causey, Tucker, GA (US); Scott Andrus, Prior Lake, MN (US); Adrianne B. Luu, Roswell, GA (US); Kevin W. Jones, St. Louis Park, MN (US)

(73) Assignee: AT&T Mobility II LLC, Atlanta, GA (US)

( * ) Notice: Subject to any disclaimer, the term of this patent is extended or adjusted under 35 U.S.C. 154(b) by 930 days.

(21) Appl. No.: 11/924,065

(22) Filed: Oct. 25, 2007

(51) Int. Cl.
*H04B 7/00* (2006.01)
*G08B 13/00* (2006.01)
*G08B 21/00* (2006.01)
*H04L 9/32* (2006.01)

(52) U.S. Cl. .................. 455/41.2; 340/539.32; 340/8.1; 340/5.31

(58) Field of Classification Search ........................ None
See application file for complete search history.

(56) References Cited

U.S. PATENT DOCUMENTS

| | | | | |
|---|---|---|---|---|
| 5,748,084 | A * | 5/1998 | Isikoff | 340/568.1 |
| 5,796,338 | A * | 8/1998 | Mardirossian | 455/134 |
| 6,154,665 | A * | 11/2000 | Briffett et al. | 455/574 |
| 6,853,840 | B2 * | 2/2005 | Najafi | 455/410 |
| 6,956,480 | B2 * | 10/2005 | Jespersen | 455/462 |
| 7,664,463 | B2 * | 2/2010 | Ben Ayed | 455/41.2 |
| 7,710,289 | B2 * | 5/2010 | Liu et al. | 455/410 |
| 2001/0002211 | A1 * | 5/2001 | Lee | 455/41 |
| 2006/0003700 | A1 * | 1/2006 | Yasuda et al. | 455/41.2 |
| 2006/0105743 | A1 * | 5/2006 | Bocking et al. | 455/411 |
| 2007/0080824 | A1 * | 4/2007 | Chen et al. | 340/825.49 |
| 2008/0305770 | A1 * | 12/2008 | Kasama | 455/411 |

OTHER PUBLICATIONS

U.S. Appl. No. 11/924,140, filed Oct. 25, 2007 by Causey, Mark Edward, et al.

* cited by examiner

*Primary Examiner* — Temesgh Ghebretinsae
*Assistant Examiner* — Gennadiy Tsvey
(74) *Attorney, Agent, or Firm* — Woodcock Washburn LLP

(57) ABSTRACT

A user configurable security profile defining relationships between a plurality of communications devices is utilized to secure a communications device in response to an occurrence of an event. In an example embodiment, the devices (e.g., cellular phone, PDA, computer, car key fob, BLUETOOTH® enabled object) are linked together via a BLUETOOTH® conformant interface. If one of the devices becomes disconnected from the link, the remaining devices are locked. Additionally, a warning can be provided on the remaining devices. A device can be unlocked by providing a code, PIN, password, or the like. A legitimate disconnection from the link, such as turning a device off, or the battery dying, will not result in the remaining devices being locked. If a device is stolen and not recovered, the user can reconfigure the security profile to exclude the stolen device.

25 Claims, 8 Drawing Sheets

BLUETOOTH SECURITY PROFILE

BACKGROUND

Wireless communications devices such as cellular telephones, mobile communication devices, personal digital assistants, wireless headsets, and the like are becoming more prevalent as users appreciate the smaller form factors and the mobility of the devices. For example, the devices may be kept near the person regularly (e.g. clipped to a belt, in a brief case, in a handbag, etc.). Often, a user may carry two or more wireless communications devices, especially when any one of them is in use. For example, a business traveler may have a cell phone clipped to a belt, a PDA in a briefcase, and a laptop computer in a computer bag. Also, for example, a student may have a cellular telephone in a backpack and a wireless headset over the ear.

Wireless communications devices may be lost, forgotten, stolen, or in any way removed from the user. Because the devices are generally portable, it may be easy to leave one behind when going from one place to another. For example, a user may accidentally leave a wireless headset behind on a table in a restaurant even though the associated cellular telephone is still attached to the belt clip. Also for example, a business person may accidentally leave a cellular telephone behind in a conference room, even though an associated PDA is still in the business person's briefcase.

Losing a wireless communications device may be very disruptive. The user loses the communications and application functions that the device provided. For example, a user may not be able to make wireless telephone calls until the device is replaced.

Perhaps even more disruptive may be the loss of important information stored on the device. Wireless communications devices may provide useful applications such as telephone lists, text-messaging, e-mail, word processing, spread sheets, instant messaging, and the like. The data stored on wireless communications devices may include valuable information. For example, the e-mail stored in a business person's PDA may contain extremely valuable corporate information, such as sales data, strategy, and new product information that has not been released to the public. A user that keeps a wireless communications device for personal use may have important personal information stored on or available by the wireless communications device. Some users may even value the information associated with the device more than the device itself.

Thus, the overall user experience associated with wireless communications devices may benefit from a security system that alerts the user to a potentially lost device and that protects the lost device from unauthorized access.

SUMMARY

Wireless communications devices may be secured by invoking an action in response to an occurrence of an event. For example, a first indication of an occurrence of an event between a first device of a plurality of devices and a second device of the plurality of devices may be received. The plurality of devices may be in communication with each other. For example, the plurality of devices may be in communication in accordance with the BLUETOOTH® protocol. For example, each of the plurality of devices may be in point-to-point wireless communication with at least one other of the plurality of devices.

In response to the first indication of the occurrence of the event, an action may be selected in accordance with a profile. The profile may include a relationship between the first and second devices, data indicative of the event, and at least one predetermined action associated with the relationship and the data indicative of the event.

The first indication may include a first value of received signal strength of the point-to-point communication being less than a predetermined second value of received signal strength. For example, the data indicative of the event may include the second value. The first indication may include a first value of distance between the first device and the second device exceeding a predetermined second value of distance. The first indication may include receiving a message from the second device.

The selected action may be invoked. The action may include disabling a function of at least one of the plurality of devices. The action may include locking a user interface of at least one of the plurality of devices. The action may include sending a message to a user and/or sounding an audible alarm at any of the plurality of devices. In an embodiment, user data may be obfuscated. For example, a random encryption key may be generated and the action may include encrypting user data stored on the first device with the random encryption key and communicating the random encryption key to a server.

A device for invoking an action in response to an occurrence of an event may include a datastore portion, a processing portion, a wireless communications portion, and a user interface portion. The datastore portion may have stored thereon the profile. The processing portion, upon receiving a first indication of the occurrence of the event with the second device, may invoke at least one predetermined action in accordance the profile. The wireless communications portion may provide point-to-point wireless communications with the second device. The wireless communications portion may measure the received signal strength of the point-to-point communications, and when the received signal strength is less than a predetermined threshold received signal strength, the processing portion may lock the user interface portion.

DETAILED DESCRIPTION

Figure 1A:
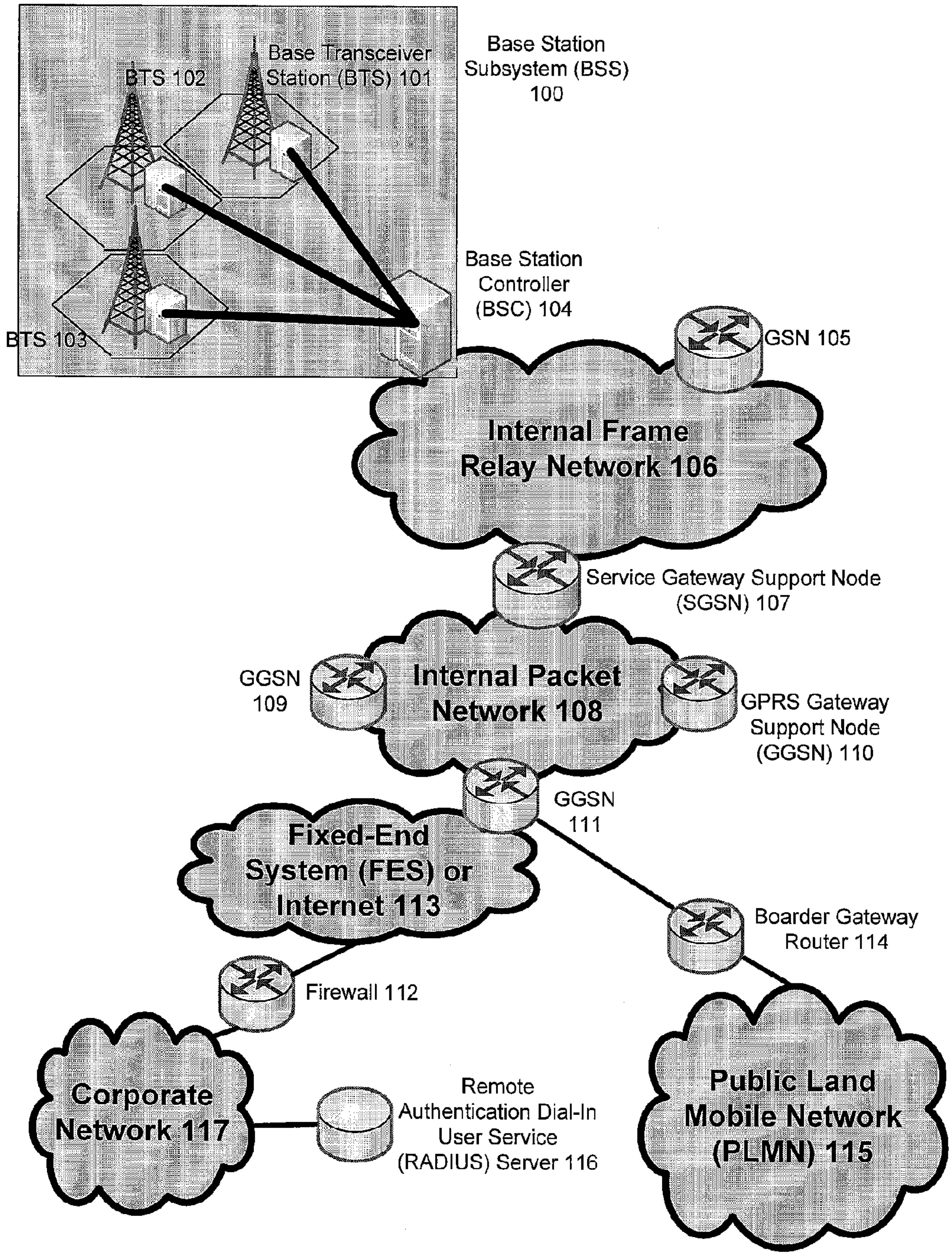
FIG. 1A depicts an overview of a network environment in which aspects of an embodiment may be implemented.
Figure 1B:
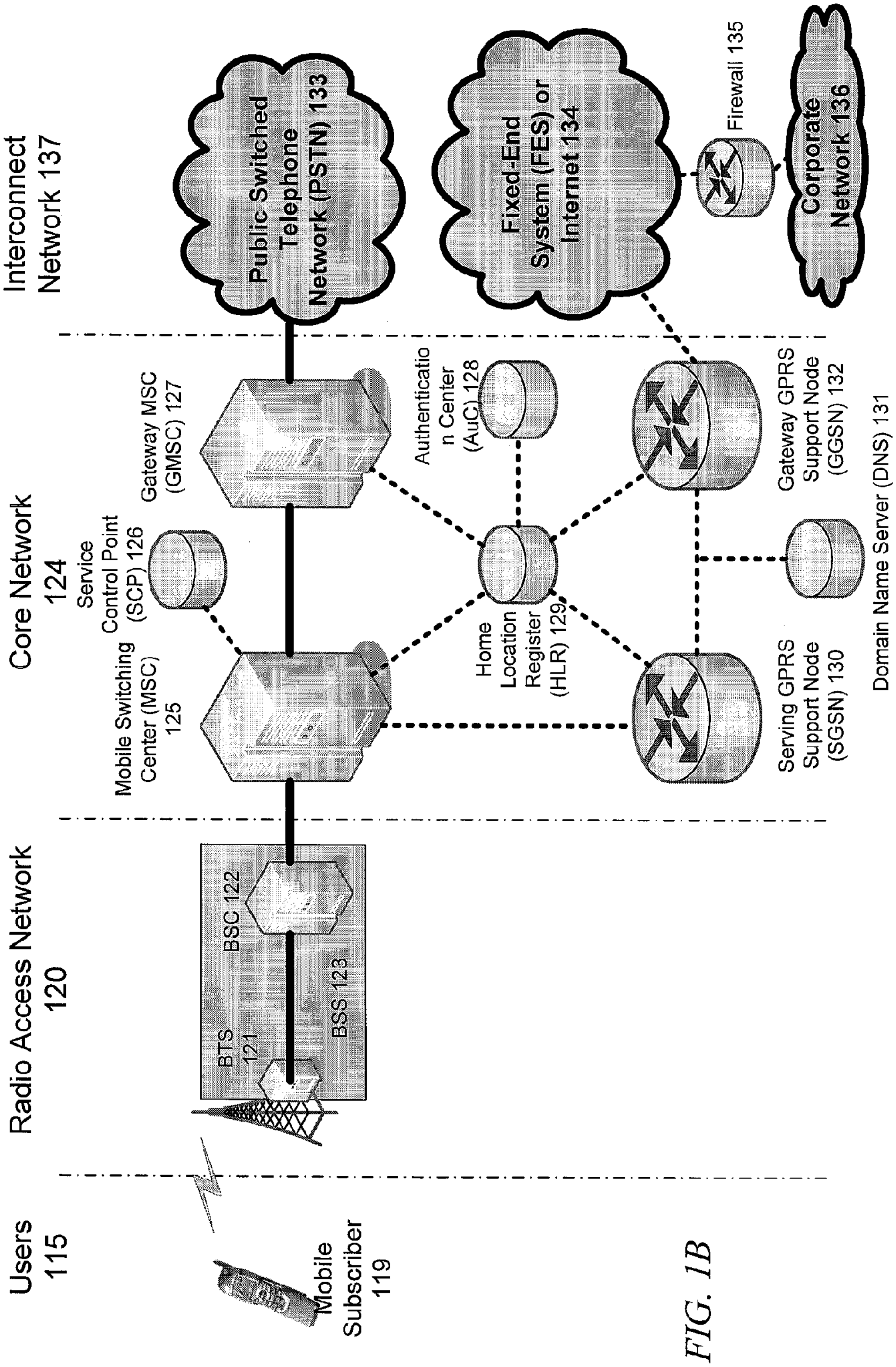
FIG. 1B depicts a GPRS network architecture in which aspects of an embodiment may be implemented.
Figure 1C:
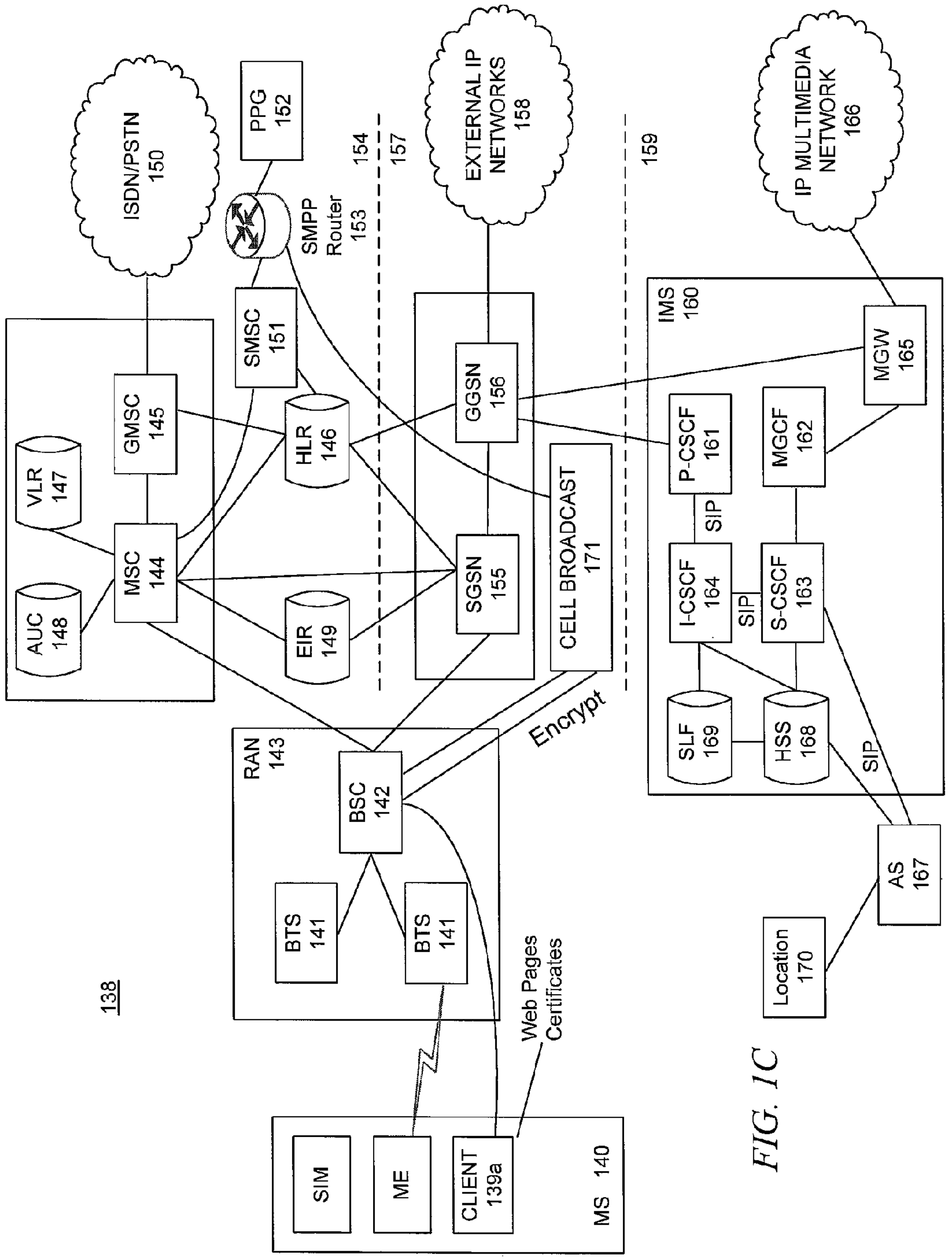
FIG. 1C depicts an alternate block diagram of an example GSM/GPRS/IP multimedia network architecture in which aspects of an embodiment may be implemented.

FIGS. 1A-C depict some example telephony radio networks and non-limiting operating environments in which a wireless security system may be used. The below-described operating environments should be considered non-exhaustive, however, and thus the below-described network architecture merely shows an example network architecture in which aspects of various embodiments may be incorporated.

One can appreciate, however, that aspects of an embodiment may be incorporated into now existing or future alternative architectures for communication networks.

The global system for mobile communication ("GSM") is one of the most widely-used wireless access systems in today's fast growing communication systems. GSM provides circuit-switched data services to subscribers, such as mobile telephone or computer users, for example. General Packet Radio Service ("GPRS"), which is an extension to GSM technology, introduces packet switching to GSM networks. GPRS uses a packet-based wireless communication technology to transfer high and low speed data and signaling in an efficient manner. GPRS optimizes the use of network and radio resources, thus enabling the cost effective and efficient use of GSM network resources for packet mode applications. For purposes of explanation, various embodiments are described herein in connection with GSM. The references to GSM are not exclusive, however, as it should be appreciated that embodiments may be implemented in connection with any type of wireless access system such as, for example, CDMA or the like.

As may be appreciated, the example GSM/GPRS environment and services described herein can also be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that shall become available in time. In this regard, the techniques of the various embodiments discussed below may be applied independently of the method of data transport, and does not depend on any particular network architecture, or underlying protocols.

FIG. 1A depicts an overall block diagram of an example packet-based mobile cellular network environment, such as a GPRS network, in which aspects of an embodiment may be practiced. In such an environment, there may be any number of subsystems that implement the functionality of the environment such as, for example, a plurality of Base Station Subsystems ("BSS") 100 (only one is shown in FIG. 1A), each of which comprises a Base Station Controller ("BSC") 104 serving a plurality of Base Transceiver Stations ("BTS") such as, for example, the BTSs 101, 102 and 103. may be the access points where users of packet-based mobile devices become connected to the wireless network. In an embodiment, the packet traffic originating from user devices is transported over the air interface to the BTS 103, and from the BTS 103 to the BSC 104. Base station subsystems, such as the BSS 100, may be a part of internal frame relay network 106 that may include Service GPRS Support Nodes ("SGSN") such as the SGSN 105 and 107. Each SGSN 105, 107, etc. may be in turn connected to an internal packet network 108 through which the SGSN 105, 107, etc. can route data packets to and from a plurality of gateway GPRS support nodes (GGSN) 109, 111, 110, etc.

As illustrated, the SGSN 107 and the GGSNs 109, 111 and 110 may be part of the internal packet network 108. Gateway GPRS serving nodes 109, 111 and 110 may provide an interface to external Internet Protocol ("IP") networks such as Public Land Mobile Network ("PLMN") 115, corporate intranets 117, Fixed-End System ("FES"), the public Internet 113 and/or the like. As illustrated, subscriber corporate network 117 may be connected to the GGSN 111 via a firewall 112; and the PLMN 115 may be connected to the GGSN 111 via a boarder gateway router 114. A Remote Authentication Dial-In User Service ("RADIUS") server 116 may be used for caller authentication when a user of a mobile cellular device calls corporate network 117, for example.

Generally, there may be four cell sizes in a GSM network—macro, micro, pico and umbrella cells. The coverage area of each cell is different in different environments. Macro cells may be regarded as cells where the base station antenna is installed in a mast or a building above average roof top level. Micro cells may be cells whose antenna height is under average roof top level; they are typically used in urban areas. Pico cells may be small cells having a diameter is a few dozen meters; they may be mainly used indoors. On the other hand, umbrella cells may be used to cover shadowed regions of smaller cells and fill in gaps in coverage between those cells.

FIG. 1B illustrates the architecture of a typical GPRS network as segmented into four areas: users 115, radio access network 120, core network 124 and interconnect network 137. The users area 115 may include a plurality of end users. The radio access network are 120 may include a plurality of base station subsystems such as the BSSs 123, which include BTSs 121 and BSCs 122. The core network are 124 may include a host of various network elements. As illustrated here, the core network 124 may include a Mobile Switching Center ("MSC") 125, a Service Control Point ("SCP") 126, a gateway MSC 127, a SGSN 130, a Home Location Register ("HLR") 129, an Authentication Center ("AuC") 128, a Domain Name Server ("DNS") 131 and a GGSN 132. The interconnect network area 137 also may include networks and network elements. As illustrated in FIG. 1B, the interconnect network are 137 may include a Public Switched Telephone Network ("PSTN") 133, a Fixed-End System ("FES") and/or the Internet 134, a firewall 135 and/or a Corporate Network 136.

A mobile switching center 125 may be connected to a large number of base station controllers. At MSC 125, for example, depending on the type of traffic, the traffic may be separated such that voice may be sent to Public Switched Telephone Network ("PSTN") 133 through Gateway MSC ("GMSC") 127, and/or data may be sent to the SGSN 130, which then sends the data traffic to the GGSN 132 for further forwarding.

When the MSC 125 receives call traffic, for example, from the BSC 122, it may send a query to a database hosted by the SCP 126. The SCP 126 may process the request and may issue a response to the MSC 125 so that it may continue call processing as appropriate.

The HLR 129 may be a centralized database for users to register with the GPRS network. The HLR 129 may store static information about the subscribers such as the International Mobile Subscriber Identity ("IMSI"), subscribed services, and/or a key for authenticating the subscriber. The HLR 129 may also store dynamic subscriber information such as the current location of the mobile subscriber. Associated with HLR 129 may be an AuC 128. The AuC 128 may be a database that contains the algorithms for authenticating subscribers and may include the associated keys for encryption to safeguard the user input for authentication.

In the following, depending on context, the term "mobile subscriber" may refer to either the end user or to the actual portable device used by an end user of the mobile cellular service. When a mobile subscriber turns a mobile device, the mobile device goes through an attach process by which the mobile device attaches to a SGSN of the GPRS network. Referring now to FIG. 1B, mobile subscriber 119 may initiate the attach process by turning on the network capabilities of the mobile device. An attach request may be sent by the mobile subscriber 119 to the SGSN 130. The SGSN 130 may query another SGSN, to which the mobile subscriber 119 may have been attached before, for the identity of the mobile subscriber 119. Upon receiving the identity of the mobile subscriber 119 from the other SGSN, the SGSN 130 may request more information from the mobile subscriber 119. This information may be used to authenticate the mobile subscriber 119 to the SGSN 130 by the HLR 129. Once the mobile subscriber 119 is verified, the SGSN 130 may send a location update to the HLR 129 indicating the change of location to a new SGSN, in this case the SGSN at 130. The HLR 129 may notify the old SGSN, to which the mobile subscriber 119 was attached, to cancel the location process for the mobile subscriber 119. The HLR 129 may then notify the SGSN 130 that the location update has been performed. At this time, the SGSN 130 may sends an "Attach Accept" message to the mobile subscriber 119, which in turn, may send an "Attach Complete" message to the SGSN 130.

After the attaching process, the mobile subscriber 119 may enter an authentication process. In the authentication process, the SGSN 130 may send authentication information to the HLR 129, which may send information back to the SGSN 130 based on the user profile that was part of the user's initial setup. The SGSN 130 may then send a request for authentication and ciphering to the mobile subscriber 119. The mobile subscriber 119 may use an algorithm to send the user identification (ID) and/or a password to the SGSN 130. The SGSN 130 may use the same algorithm to compare the result. If a match occurs, the SGSN 130 may authenticate the mobile subscriber 119.

Next, the mobile subscriber 119 may establish a user session with the destination network, for example, the corporate network 136, by going through a Packet Data Protocol ("PDP") activation process. The mobile subscriber 119 may request access to the Access Point Name ("APN"), for example, UPS.com, and the SGSN 130 may receive the activation request from the mobile subscriber 119. The SGSN 130 may then initiate a Domain Name Service ("DNS") query to learn which GGSN node has access to the UPS.com APN. The DNS query may be sent to the DNS server 131 within the core network 124 which may be provisioned to map to one or more GGSN nodes in the core network 124. Based on the APN, the mapped GGSN 132 may access the requested corporate network 136. The SGSN 130 may then send to the GGSN 132 a Create Packet Data Protocol ("PDP") Context Request message. The GGSN 132 may send a Create PDP Context Response message to the SGSN 130, which may then send an Activate PDP Context Accept message to the mobile subscriber 119.

Once activated, data packets of the call made by the mobile subscriber 119 may then go through radio access network 120, core network 124, and interconnect network 137, to reach corporate network 136.

FIG. 1C shows another example block diagram view of a GSM/GPRS/IP multimedia network architecture 138. As illustrated, the architecture 138 of FIG. 1C includes a GSM core network 154, a GPRS network 157 and/or an IP multimedia network 159. The GSM core network 154 may include a Mobile Station (MS) 140, at least one Base Transceiver Station (BTS) 141, and/or a Base Station Controller (BSC) 142. The MS 140 may be Mobile Equipment (ME), such as a mobile phone and/or a laptop computer 202*c* that is used by mobile subscribers, with a Subscriber identity Module (SIM). The SIM may include an International Mobile Subscriber Identity (IMSI), which may include a unique identifier of a subscriber. The BTS 141 may be physical equipment, such as a radio tower, that enables a radio interface to communicate with the MS 140. Each BTS may serve more than one MS 140. The BSC 142 may manage radio resources, including the BTS 141. The BSC 142 may be connected to several BTS 141. The BSC 142 and BTS 141 components, in combination, are generally referred to as a base station (BS) and/or a radio access network (RAN) 143.

The GSM core network 154 may include a Mobile Switching Center (MSC) 144, a Gateway Mobile Switching Center (GMSC) 145, a Home Location Register (HLR) 146, a Visitor Location Register (VLR) 147, an Authentication Center (AuC) 149, and an Equipment Identity Register (EIR) 148. The MSC 144 may perform a switching function for the network. The MSC may performs other functions, such as registration, authentication, location updating, handovers, and call routing. The GMSC 145 may provide a gateway between the GSM network and other networks, such as an Integrated Services Digital Network (ISDN) or a Public Switched Telephone Network (PSTN) 150. In other words, the GMSC 145 may provide interworking functionality with external networks.

The HLR 146 may include a database that contains administrative information regarding each subscriber registered in a corresponding GSM network. The HLR 146 may contain the current location of each mobile subscriber. The VLR 147 may include a database that contains selected administrative information from the HLR 146. The VLR may contain information necessary for call control and provision of subscribed services for each mobile subscriber currently located in a geographical area controlled by the VLR 147. The HLR 146 and the VLR 147, together with MSC 144, may provide call routing and roaming capabilities of the GSM network. The AuC 148 may provide parameters for authentication and/or encryption functions. Such parameters may allow verification of a subscriber's identity. The EIR 149 may store security-sensitive information about the mobile equipment.

The Short Message Service Center (SMSC) 151 may allow one-to-one Short Message Service (SMS) messages to be sent to/from the mobile subscriber 140. For example, the Push Proxy Gateway (PPG) 152 may be used to "push" (i.e., send without a synchronous request) content to mobile subscriber 102. The PPG 152 may act as a proxy between wired and wireless networks to facilitate pushing of data to MS 140. Short Message Peer to Peer (SMPP) protocol router 153 may be provided to convert SMS-based SMPP messages to cell broadcast messages. SMPP may include a protocol for exchanging SMS messages between SMS peer entities such as short message service centers. It may allow third parties, e.g., content suppliers such as news organizations, to submit bulk messages.

To gain access to GSM services, such as speech, data, and short message service (SMS), the MS 140 may first registers with the network to indicate its current location by performing a location update and IMSI attach procedure. MS 140 may send a location update including its current location information to the MSC/VLR, via the BTS 141 and the BSC 142. The location information may then be sent to the MS's HLR. The HLR may be updated with the location information received from the MSC/VLR. The location update may also be performed when the MS moves to a new location area. Typically, the location update may be periodically performed to update the database as location updating events occur.

GPRS network 157 may be logically implemented on the GSM core network architecture by introducing two packet-switching network nodes, a serving GPRS support node (SGSN) 155 and a cell broadcast and a Gateway GPRS support node (GGSN) 156. The SGSN 155 may be at the same hierarchical level as the MSC 144 in the GSM network. The SGSN may control the connection between the GPRS network and the MS 140. The SGSN may also keep track of individual MS locations, security functions, and access controls.

The Cell Broadcast Center (CBC) 171 may communicate cell broadcast messages that are typically delivered to multiple users in a specified area. A Cell Broadcast may include a one-to-many geographically focused service. It may enable messages to be communicated to multiple mobile phone customers who are located within a given part of its network coverage area at the time the message is broadcast.

The GGSN 156 may provides a gateway between the GPRS network and a public packet network (PDN) or other IP networks 158. That is, the GGSN may provide interworking functionality with external networks, and may set up a logical link to the MS through the SGSN. When packet-switched data leaves the GPRS network, it is transferred to external TCP-IP network 158, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services may be used in parallel. The MS may operate in one three classes: class A, class B, and class C. A class A MS may attach to the network for both GPRS services and GSM services simultaneously. A class A MS may also support simultaneous operation of GPRS services and GSM services. For example, class A mobiles may receive GSM voice/data/SMS calls and GPRS data calls at the same time. The class B MS may attach to the network for both GPRS services and GSM services simultaneously. However, the class B MS may not support simultaneous operation of the GPRS services and GSM services. That is, the class B MS may use one of the two services at a given time. A class C MS may attach to one of the GPRS services and GSM services at a time.

The GPRS network 157 may be designed to operate in three network operation modes (NOM1, NOM2 and NOM3). A network operation mode of a GPRS network may be indicated by a parameter in system information messages transmitted within a cell. The system information messages may dictate to a MS where to listen for paging messages and how signal towards the network. The network operation mode may represent the capabilities of the GPRS network. In a NOM1 network, a MS may receive pages from a circuit switched domain (voice call) when engaged in a data call. The MS may suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS may monitor pages for a circuit switched network while received data and vise versa.

IP multimedia network 159 was introduced with 3GPP Release 5, and includes IP multimedia subsystem (IMS) 160 to provide rich multimedia services to end users. A representative set of the network entities within IMS 160 are a call/session control function (CSCF), media gateway control function (MGCF) 162, media gateway (MGW) 165, and a master subscriber database, referred to as a home subscriber server (HSS) 168. HSS 168 may be common to GSM network 154, GPRS network 157 as well as IP multimedia network 159.

IP multimedia system 160 is built around the call/session control function, of which there are three types: interrogating CSCF (I-CSCF) 164, proxy CSCF (P-CSCF) 161 and serving CSCF (S-CSCF) 163. P-CSCF 161 may be the MS's first point of contact with IMS 160. P-CSCF 161 forwards session initiation protocol (SIP) messages received from the MS to an SIP server in a home network (and vice versa) of the MS. P-CSCF 161 may also modify an outgoing request according to a set of rules defined by the network operator (for example, address analysis and potential modification).

The I-CSCF 164 may be an entrance to a home network, may hide the inner topology of the home network from other networks, and may provides flexibility for selecting an S-CSCF. The I-CSCF 164 may contact subscriber location function (SLF) 169 to determine which HSS 168 to use for the particular subscriber, if multiple HSSs 168 are present. The S-CSCF 163 may perform the session control services for the MS 140. This includes routing originating sessions to external networks and routing terminating sessions to visited networks. S-CSCF 163 may also decide whether application server (AS) 167 is required to receive information on an incoming SIP session request to ensure appropriate service handling. This decision may be based on information received from HSS 168 (or other sources, such as application server 167). The AS 167 also communicates to location server 170 (e.g., a Gateway Mobile Location Center (GMLC)) that provides a position (e.g., latitude/longitude coordinates) of the MS 140.

The HSS 168 may contain a subscriber profile and may keep track of which core network node is currently handling the subscriber. It may also support subscriber authentication and authorization functions (AAA). In networks with more than one HSS 168, a subscriber location function provides information on HSS 168 that contains the profile of a given subscriber.

The MGCF 162 may provide interworking functionality between SIP session control signaling from IMS 160 and ISUP/BICC call control signaling from the external GSTN networks (not shown). It also may control the media gateway (MGW) 165 that provides user-plane interworking functionality (e.g., converting between AMR- and PCM-coded voice). The MGW 165 may communicate with other IP multimedia networks 166.

The Push to Talk over Cellular (PoC) capable mobile phones may register with the wireless network when the phones are in a predefined area (e.g., job site, etc.). When the mobile phones leave the area, they may register with the network in their new location as being outside the predefined area. This registration, however, may not indicate the actual physical location of the mobile phones outside the pre-defined area.

While the various embodiments have been described in connection with the preferred embodiments of the various figures, it is to be understood that other similar embodiments may be used or modifications and additions may be made to the described embodiment for performing the same function of the various embodiments without deviating therefrom. Therefore, the embodiments should not be limited to any single embodiment, but rather should be construed in breadth and scope in accordance with the appended claims.

Figure 2:
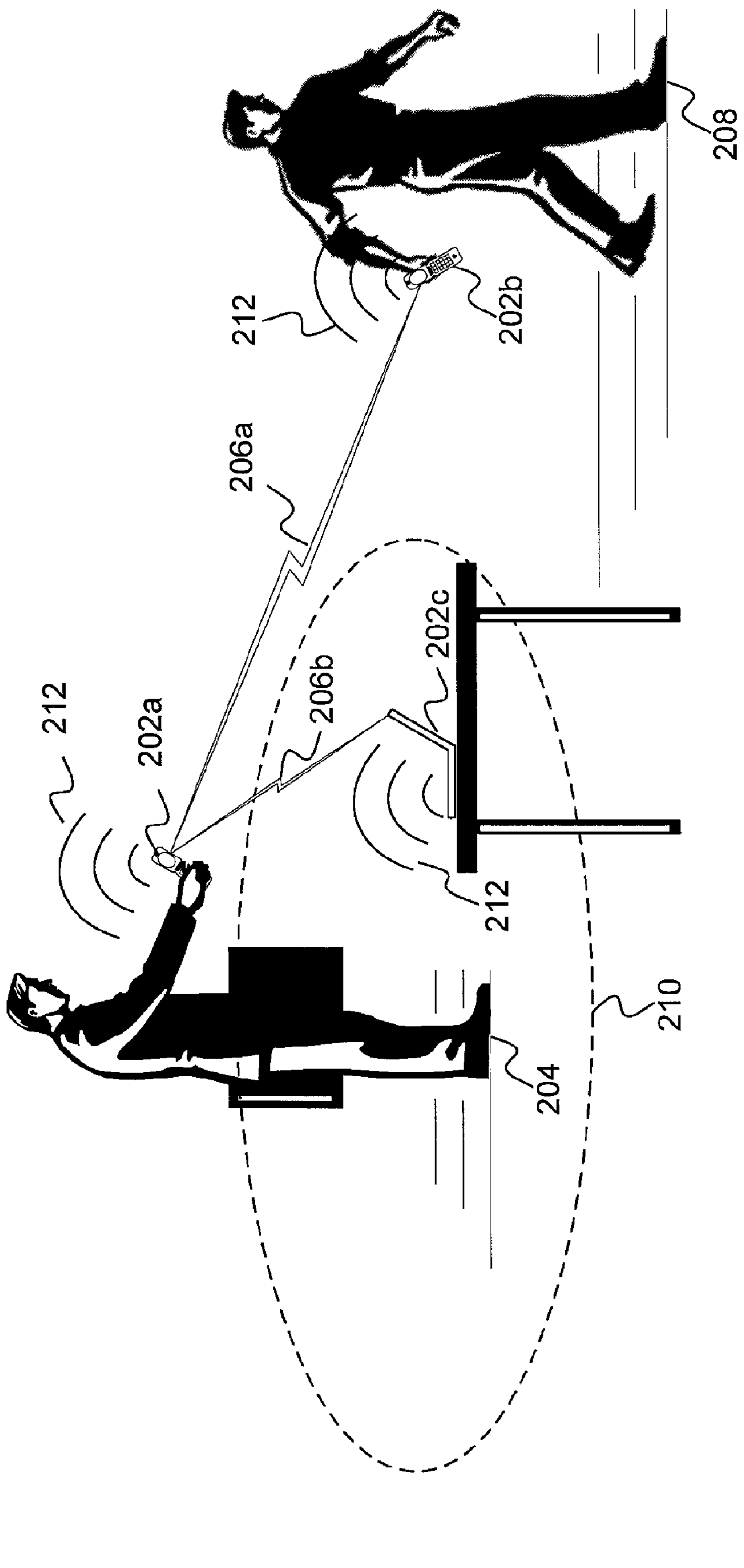
FIG. 2 depicts an example security system for protecting wireless communications devices.

FIG. 2 depicts an example security system for protecting wireless communications devices 202*a-c*. The wireless communications devices 202*a-c* may be any electronic device suitable for providing wireless communications. For example, the wireless communications devices 202*a-c* may include a cellular telephone 202*a*, a personal digital assistant (PDA 202*b*) 202*b*, a wireless enabled laptop computer 202*c*, a text messaging device, a wireless token, and the like.

A user 204 may own, operate, and/or control a plurality of wireless communications devices 202*a-c*. To illustrate, the user may have a cellular telephone 202*a*, a PDA 202*b*, and a laptop computer 202*c*. The cellular telephone 202*a* and the PDA 202*b* may be in wireless communications via a first wireless communications channel 206*a*. The cellular telephone 202*a* and the laptop computer 202*c* may be in a wireless communications via a second wireless communications channel 206*b*. The first and/or second wireless communications channels 206*ab* may be a point-to-point wireless communications channel. For example, the point-to-point wireless communications may include RF communications. For example, the point-to-point wireless communications may be in accordance with the BLUETOOTH® protocol. In an embodiment, for example, the first and/or second wireless communications channels 206*a-b* may be established via a wireless network (for example, the network depicted in FIG. 1A-C).

The system may include a profile (not shown) that provides a logically mapping between and/or among the wireless communications devices 202*a-c* that are in wireless communications with each other. For example, the devices may organized by logically paired relationships. When any of the devices in the profile experience a defined event (i.e., being separated by a distance greater than a defined proximity), an action (i.e., locking the device, sounding an alarm, etc.) may be invoked on any and/or all of the wireless communications devices 202*a-c* in the profile.

As illustrated in FIG. 2, the cellular telephone 202*a* and the laptop computer 202*c* may be near the user 204 and/or each other. For example, the user may have the laptop computer 202*c* on a nearby table and the cellular telephone 202*a* may be in the user's hand. Also illustrated in FIG. 2, a thief 208 may take the PDA 202*b*. Once the PDA 202*b* has left a predefined proximity 210 in relation to the cellular telephone 202*a* and/or the laptop computer 202*c*, the event may be triggered. For example, the cellular telephone 202*a* may detect that the strength of the wireless signal from the PDA 202*b* has decreased below a threshold signal strength. Likewise, the PDA 202*b* may detect that the strength of the wireless signal from the cellular telephone 202*a* has decreased below a threshold signal strength.

When this event has been detected at the PDA 202*b* and/or the cellular telephone 202*a*, the action associated with the event in the profile may be invoked. For example, the user interfaces on any and/or all the wireless communications device may become locked. For example, The cellular telephone 202*a* may communicate the event to the laptop computer 202*c*, and the user interface of the laptop computer 202*c* may lock as well. The wireless communications devices 202*a-c* may each sound an alarm 212 alerting the user to the missing and/or taken PDA 202*b*.

Figure 3:
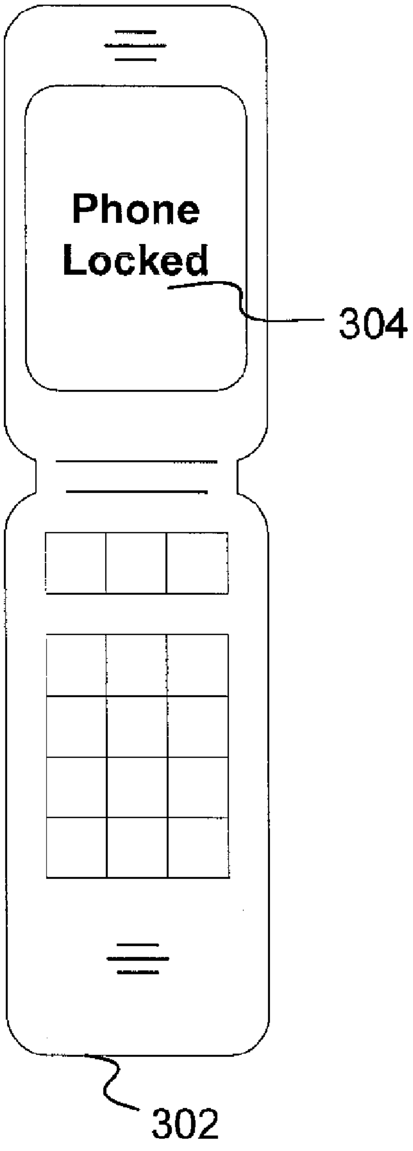
FIG. 3 depicts an example locked wireless communications device.

The invoked action may protect the wireless communications device. The sounding alarm 212 may prevent any of the wireless communications devices 202*a-c* from being lost and/or forgotten. Furthermore, because the user interface of the taken PDA 202*b* may be locked, the stolen device may be protected from unauthorized use by the thief. For example, FIG. 3 depicts an example locked wireless communications device 302. The wireless communications device may have a user interface 304. The locked user interface may prevent the device from being used to access a wireless network, to access the data stored thereon, and/or the like. Thus, the data stored on the stolen device may be protected from unauthorized access and/or disclosure.

In an embodiment, the action may be excepted from being invoked under certain conditions defined in the profile. For example, where any of the wireless communications devices may be properly powered off, the wireless communication device may communicate the exception to the other devices. Thus, when the loss of wireless signal strength results from properly powering off any one of the wireless communications devices, the action may be excepted from being invoked.

In some situations, the user may recover the device and/or the action may have been invoked inadvertently. In an embodiment, the invoked action may be overridden by the user. For example, the user interface may be unlocked via a user entered override code. The override code may be entered on the keypad.

Figure 4:
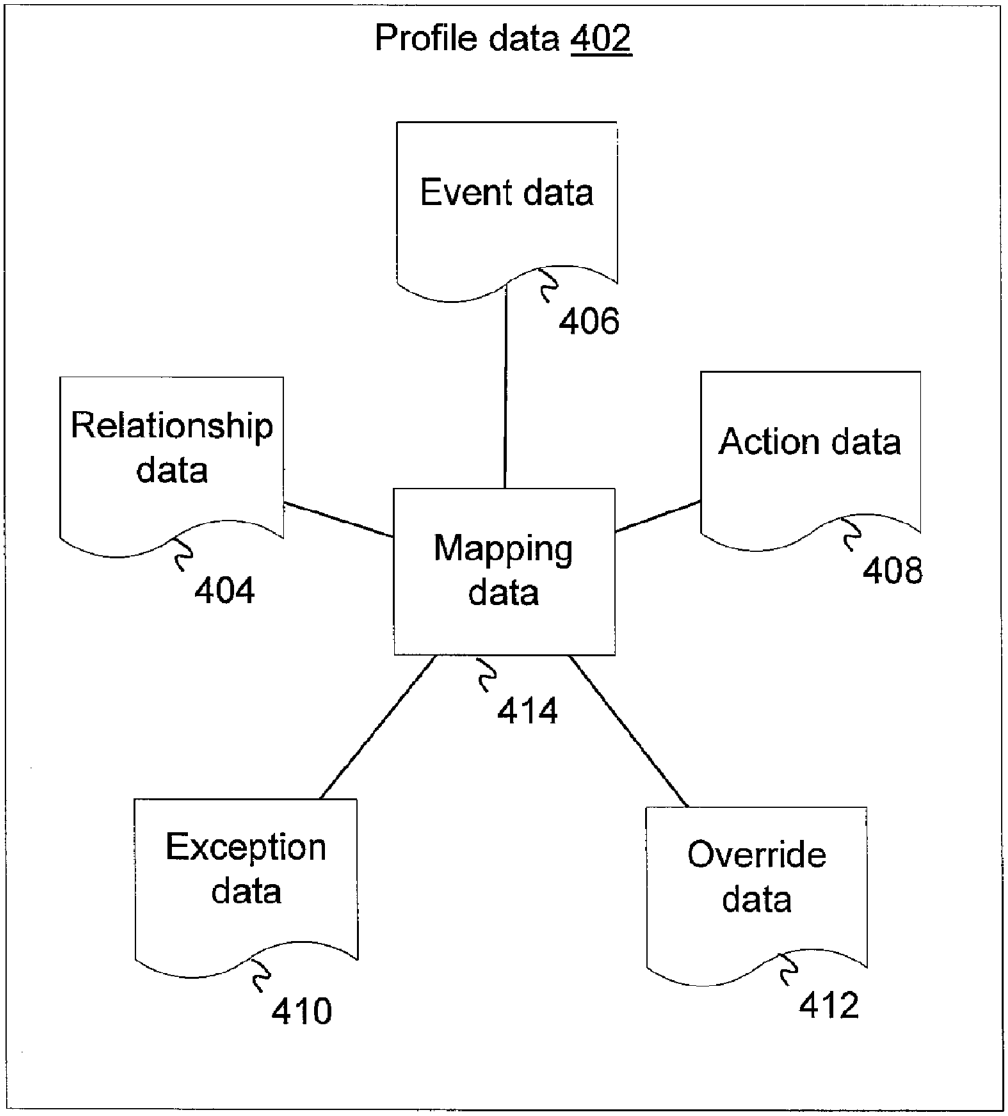
FIG. 4 depicts a block diagram of example profile data for a wireless communications device.

FIG. 4 depicts a block diagram of example profile data 402 for a plurality of wireless communications devices. The nature of the security provided the wireless communications devices may be defined by the profile data 402. The profile data 402 may store and/or structure data indicative of relationships 404 between and/or among the devices, events 406, actions 408, exceptions 410, overrides 412, and/or the mapping 414 between and/or among such data.

The data stored and/or structured by the profile data 402 may be inputted by the user. For example, any of the wireless communications devices may include a menu option via the user interface that allows the user to create, edit, and/or delete data from the profile data 402. The user may interface with a webpage that communicates the profile data 402 via a wireless network to the wireless communications devices. Also for example, the profile data 402 may be defined by a wireless carrier and/or hardware manufacturer, such that the profile data 402 is defined in advance of the user obtaining the device. The profile data 402 may be "hardcoded" into the logic of the wireless communications device. The profile data 402 may be predetermined prior to the occurrence of an event.

In an embodiment, the profile data 402 may be stored at "master" location. For example, the master location may include a master wireless communications device, a master server within the carrier network, and/or the like. The master location may store a complete version of the profile data 402 and may distribute to the wireless communications devices in the profile data 402 the portion of the data applicable to the specific device. In other words, the profile data 402 is partially replicated among the wireless communications devices. In an embodiment, the profile data 402 may be fully replicated. A full copy of the profile data 402 may be stored at every wireless communications device. The wireless communications device may communicated changes to the profile data 402 between and/or among each other.

The profile data 402 may include relationship data 404. The relationship data 404 may include the identification of the wireless communications devices in the profile data 402. The relationship data 404 may include a logical pairing of the devices in the profile data 402. For example, devices that communicate with each other via a point-to-point wireless communications channel may be represented as a pair in the relationship data 404.

To illustrate, a user may own three wireless communications devices, and the user may enter the three devices into the relationship data 404 of the profile data 402. The relationship data 404 may include a electronic serial identification (ESI) number, model number, telephone number, and the like associated with each wireless communications device. The profile data 402 may include a handle or label associated with each wireless communications device to make it easy for the user to relate the relationship data 404 to a particular wireless communications device.

The profile data 402 may include event data 406. Event data 406 may be indicative of an event. An event may be any detectable aspect of operations associated with any and/or all of the wireless communications devices. The event data 406 may be uniform across all of the wireless communications devices within the profile data 402 and/or it may be specific to a subset and/or an individual device. The event may be associated with an individual device. For example, the event data 406 may include a maximum number of failed password attempts. The event may be associated with a relationship between and/or among the devices. A plurality of the wireless communications devices may define a relationship. The relationship may be that of physical proximity and/or distance, wireless communications signal strength, query and response messaging, and the like. The event may relate to a detectable quality of the relationship.

In an embodiment, the wireless communications devices may be enabled with global positioning system (GPS) capabilities. The wireless communication devices may communicate their location coordinates to each other and/or a server in the wireless network. For example, the location coordinate may be stored at the HRL 129. The type of event may include a predetermined threshold distance associated with each of the wireless communications devices. The event may be triggered when the physically distant of any of the wireless communications devices to another wireless communications device exceeds the threshold distance.

The event data 406 may include normal operating areas. The event data 406 may include a predefined operations area such as a business location, a campus, and/or a state. The normal operating areas may be static as defined by the user and/or dynamic, in which the network monitors the location coordinates overtime to determine the normal operating patterns. The event may be triggered when any of the wireless communications devices extends beyond the normal operating areas.

In an embodiment, the wireless communications devices may monitor the relative signal strength of the associated wireless communications channel between and/or among them. For example, referring to FIG. 2, the cellular telephone 202*a* and the PDA 202*b* may monitor the signal strength associated with the first wireless communications channel. The profile data 402 may define one or more pair relationships. Each pair relationship may be include a threshold signal strength associated with each of the wireless communication devices. The type of event may include a value of signal strength associated with any of the wireless communications channels being less than predetermined threshold value of signal strength. In this way, the signal strength may serve as a proxy for physical proximity. Again referring to FIG. 2, when the thief walks away with the PDA 202*b*, the distance between the cellular telephone 202*a* and the PDA 202*b* may increase. This increase in distance may result in a decrease in the signal strength received at the PDA 202*b* and that the cellular telephone 202*a*. Once the signal strength had dropped below the threshold value, the event may be triggered.

An embodiment, the event data 406 may be indicative of electronic messaging between and/or among the wireless communications devices within the profile data 402. For example, an event may be detected at a first wireless communications device. The first wireless communications device may communicate the event to a second wireless communications device via a message. Referring to FIG. 2, the laptop computer 202*c* may receive a message from the cellular telephone 202*a* indicative of the event detected between the cellular telephone 202*a* and the PDA 202*b*.

An embodiment, the event data 406 may include a query and a response between and/or among the wireless communications devices within the profile data 402. For example, the event may include a status at one or more of the wireless communications devices. A first wireless communications device may query a second wireless communications device for status. The status may include physical location, operations status, and/or any measurable quality of operation. The second wireless communications device may respond with the status. The first wireless communications data may determine an event from this status. For example, the type of event may include a set of operations that are not typically conducted at the same time. To illustrate, the user may understand that having two simultaneous telephone calls is unlikely and would be indicative of a lost and/or stolen device. Status indicative of both devices being in a telephone call may trigger the event.

The profile data 402 may include action data 408. The action data 408 may be predetermined prior to an occurrence of an event. In response to the event, each wireless communications device may select a predetermined action to take. The action data 408 may include a plurality of actions. Each action may relate to protecting the wireless communications device and/or the data stored thereon from theft, loss, damage, unauthorized use, or the like. In an embodiment, the action may include disabling a function of the wireless communications device. For example, each user interface of the wireless communications devices may be locked (as shown, for example, in FIG. 3). Also for example, aspects of the wireless communications with the network (like that shown in FIGS. 1A-C) may be disabled. The wireless communications devices may be prevented from making telephone calls, text messages, e-mail messages, voicemail messages, and the like. In response to receiving an indication of an occurrence of an event, the wireless communications device may select an action based on the relationship between the devices, the nature of the event, and the action associated with the relationship and the event.

In an embodiment, the wireless communications devices may alert the user. The alert may be an audio, visual, textual, and/or the like. For example, the wireless communications devices may sound the alarm. For example, the wireless communications devices may alert a call center and/or maintenance personnel associated with the network and/or carrier. For example, wireless communications devices may alert a system administrator, owner, contact person, public authorities, or the like. The wireless communications devices may send an e-mail or SMS message alerting another person of the event. The alert may include data related to the devices and the events including time and/or geographic coordinates.

In an embodiment, the wireless communications devices may invoke an action to protect the user data stored thereon. The user data may include the data accumulated on the device from operations taken by the user. For example, the user data may include stored e-mails, spreadsheets, word processing documents, voicemails, and/or the like. To protect this data from unauthorized disclosure, for example, the wireless communications devices may invoke an action to obfuscate the user data. To protect this data from unauthorized disclosure, for example, the wireless communications devices may invoke an action to delete the user data.

Also for example, the wireless communications devices may encrypt the user data. The wireless communications devices may generate an encryption key. The encryption key may be generated at random. The wireless communications devices may use the generated encryption key to encrypt the user data. The wireless communications devices may communicate the generated encryption key to a server in the wireless network. Thus, the data may be protected even if the device's hardware is compromised.

The profile data 402 may include exception data 410. When an event is triggered the action may be prevented from being invoked if an exception applies. The exception may include any condition, situation, parameter, or the like, in light of which would make invoking the action unnecessary to the user. For example, a device being powered off may cause the signal strength to drop below a threshold signal strength. Where the signal strength is being monitored to determine whether or not to invoke the action, an exception may apply to the process of powering off the device. The device may communicate that it is powering off, and the subsequent drop in signal strength would be excepted from invoking an action.

Also for example, a user may enter a code indicating a window within which an exception applies. The window may be a time window, geographical window, or the like. The user may enter a secret code to establish the window. Within the window, events which would otherwise invoke an action would be excepted from invoking the action. For example, the user may know ahead of time that devices within the same profile data 402 will lose geographic proximity. To illustrate, the user may be in a meeting with a laptop computer on the meeting table and a cellular telephone in a belt clip holster. The user may wish to leave the meeting room to make a wireless telephone call from the cellular telephone. The distance between the where the user wishes to make the wireless telephone call and where the laptop computer is sitting may be such that an event may be triggered; however, the user may wish that the action not be invoked. Thus, the user may indicate an exception to the cellular telephone. For example, the user may enter a code into the cellular telephone before leaving the room. The cellular telephone may communicate the exception to the laptop computer. When the user leaves the room, the event may be detected at the cellular telephone and/or the laptop computer, but the action may be excepted from being invoked. For example, a "no-operation" action may be invoked.

The profile may include override data 412. One or more overrides may be associated with the wireless communication devices and the associated events and actions. The override data 412 may include any activity, input, data, indication, and/or the like to interrupt and/or discontinue the invoked action following an event. In embodiment, the override may include entering a code.

For example, a user may inadvertently trigger an event that invokes an action. To illustrate, the user may inadvertently separate two devices in the profile beyond a proximity threshold. As a result of the separation, each device may lock its respective user interface and sound the alarm. The user may override the lock user interface and the alarm by entering a code into either of the devices. The code may be a predefined secret code such as a personal identification number (PIN).

In an embodiment, the code may be a dynamically defined code generated by at least one of the wireless communications devices and communicated to another users device outside the profile data 402, a carrier operations center, administrator, enterprise IT department, and/or the like. The user may obtain the code, and the actions 408 may be overridden.

The profile data 402 may include a mapping 414 of the relationship data 404, event data 406, action data 408, exception data 410, and/or override data 412. The mapping data 414 may related the particular devices, events, actions 408, exceptions, and/or overrides in a orientation that provides the results expected by the user. The mapping data 414 may include logical operations between and/or among the relationship data 404, event data 406, action data 408, exception data 410, and/or override data 412. The mapping data 414, relationship data 404, event data 406, action data 408, exception data 410, and/or override data 412 may be configurable.

The mapping data 414 may relate the action data 408 to relationship data 404 and event data 406. For example, the relationship data 414 may indicate pair-wise relationships associated with the devices. The pairwise relationships may relate to the wireless communications channels established between and/or among the wireless communications devices. For each pairwise relationship, the user may define one or more events. Each event may be associated with one or more actions 408. Thus, upon an occurrence of an event between two devices, the action to be invoked may be selected according to the mapping of the relationship data 414 and the event data 406 to the action data 408. In addition, the user may define via the user interface portion 506 exceptions and overrides associated with each event and/or action.

Figure 5:
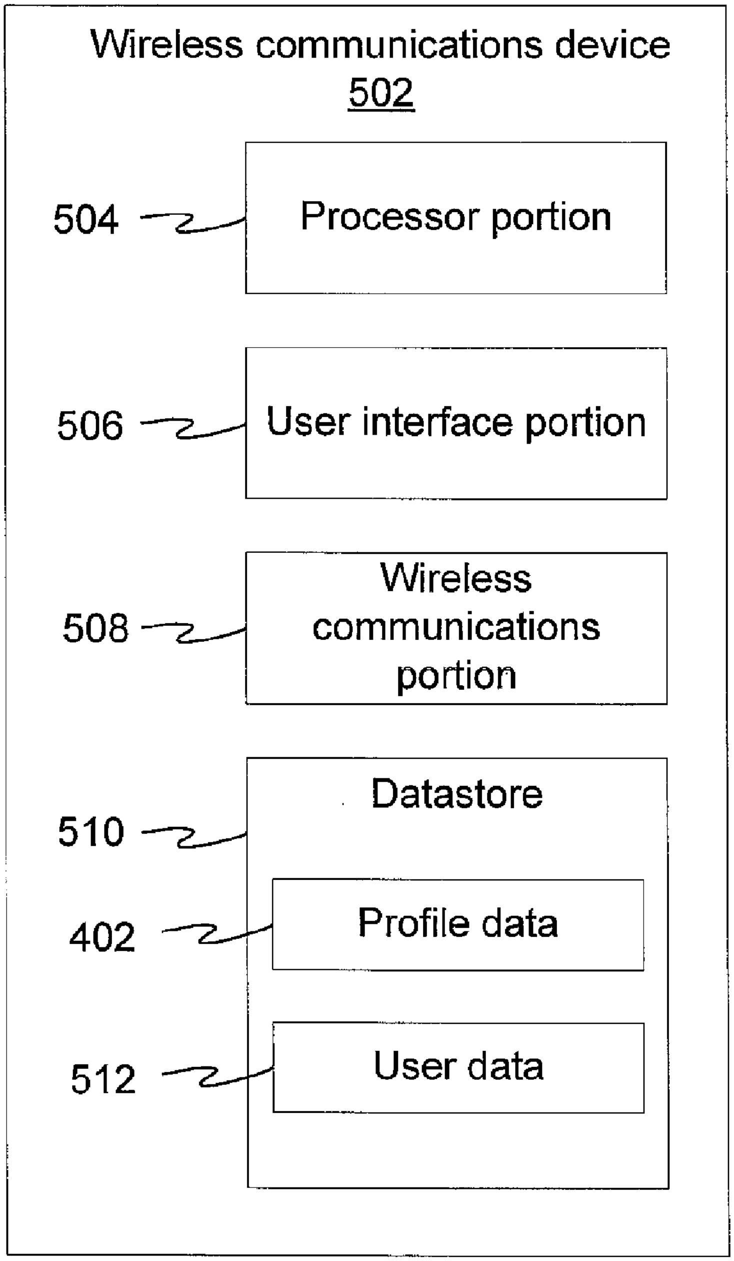
FIG. 5 depicts a block diagram of an example wireless communications device.

FIG. 5 depicts a block diagram of an example wireless communications device 502. The wireless communications device may include a processing portion 504, a user interface portion 506, a wireless communications portion 508, and a datastore portion 510. The datastore portion 510 may have stored thereon profile data 402 and user data 512.

The processing portion 504 may include any hardware and/or software necessary for operating and/or controlling the user interface portion 506 the wireless communications portion, and the data store portion. For example, the processing portion 504 may be individual digital logic components, a processor, a microprocessor, and application-specific integrated circuit (ASIC), and the like. The processing portion 504 may include memory such as random access memory, register memory, cache memory and the like memory may include computer executable attractions by which the processing portion 504 may operate. For example, computer executable structures may include computer executable code that when executed operate the relevant actions associated with the profile data 402. For example, the computer executable structure and may operate the method provided in FIG. 5.

The processor may be an communication with the user interface portion 506, the wireless communications portion, and/or the datastore portion. For example, the processing portion 504 may store and/or retrieve profile data 402 to and/or from the data store portion. The processing portion 504 may control the user interface portion 506. For example, the processing portion 504 may direct the user interface portion 506 to output information visually and/or audibly, and the processing portion 504 may direct the user interface portion 506 to receive input from the user. The processing portion 504 may control the wireless communications portion. For example, the processing portion 504 may send and/or receive data via the wireless communications portion. The processing portion 504 may operate on the profile data 402 to detect events, invoke actions, apply exceptions, and/or receive overrides.

The user interface portion 506 may be, in any combination of hardware and/or software, any component, system and/or subsystem for receiving input from a user and outputting information to the user. The user interface portion 506 may include a display and/or keyboard. The keyboard may be a numerical pad. For example, the user interface portion 506 may include a telephone keypad, programmable softkeys, mechanical buttons, touch-screens, and/or the like. The display may provide visual output. The user interface portion may include a speaker for audio output. The user interface portion 506 may include a microphone for audible input. The processor may invoke an action to direct the user interface portion 506 to operate in a locked mode. In the locked mode, the user interface portion 506 may disable input and output features.

The wireless communications portion may be, in any combination of hardware and/or software, any component, system, and/or subsystem for providing wireless communications to and/or from the device. The wireless communications portion may provide a wireless communications channel between the device and a peer device (now shown). The wireless communications portion may provide point-to-point wireless communications between the device and a peer device. The wireless communications portion may provide radio frequency (RF) communications between the device and the peer device. For example, the wireless communications portion may communicate in accordance with the BLUETOOTH® protocol, such as BLUETOOTH® 1.0, BLUETOOTH® 1.0B, BLUETOOTH® 1.1, BLUETOOTH® 1.2, BLUETOOTH® 2.0, BLUETOOTH® 2.0+ Enhanced Data Rate (EDR), BLUETOOTH® 2.1+EDR, Institute of Electrical and Electronics Engineers, Inc. (IEEE) specification 802.15.1, or the like.

The wireless communications portion may provide a wireless communications channel between the device and a wireless communications network such as the radio access network (see FIG. 1B). The wireless communications portion may provide a cellular communications. The wireless communication portion may provide wireless data network communications such as, Wi-Fi (IEEE 802.11) and WiMAX (IEEE 802.16) for example.

The data store may be any component, system, and/or subsystem suitable for storing data. For example, the data store portion may include random access memory, flash memory, magnetic storage, and/or the like. The datastore may have stored therein at least a portion of the profile data 402. In an embodiment, the profile data 402 stored in the datastore may be a fully replicated version of the profile data 402. In an embodiment, the profile data 402 stored in the datastore may be a partially replicated version of the profile data 402, representing the portion of the profile data 402 relevant to the device on which the partially replicated profile data 402 is stored.

Figure 6:
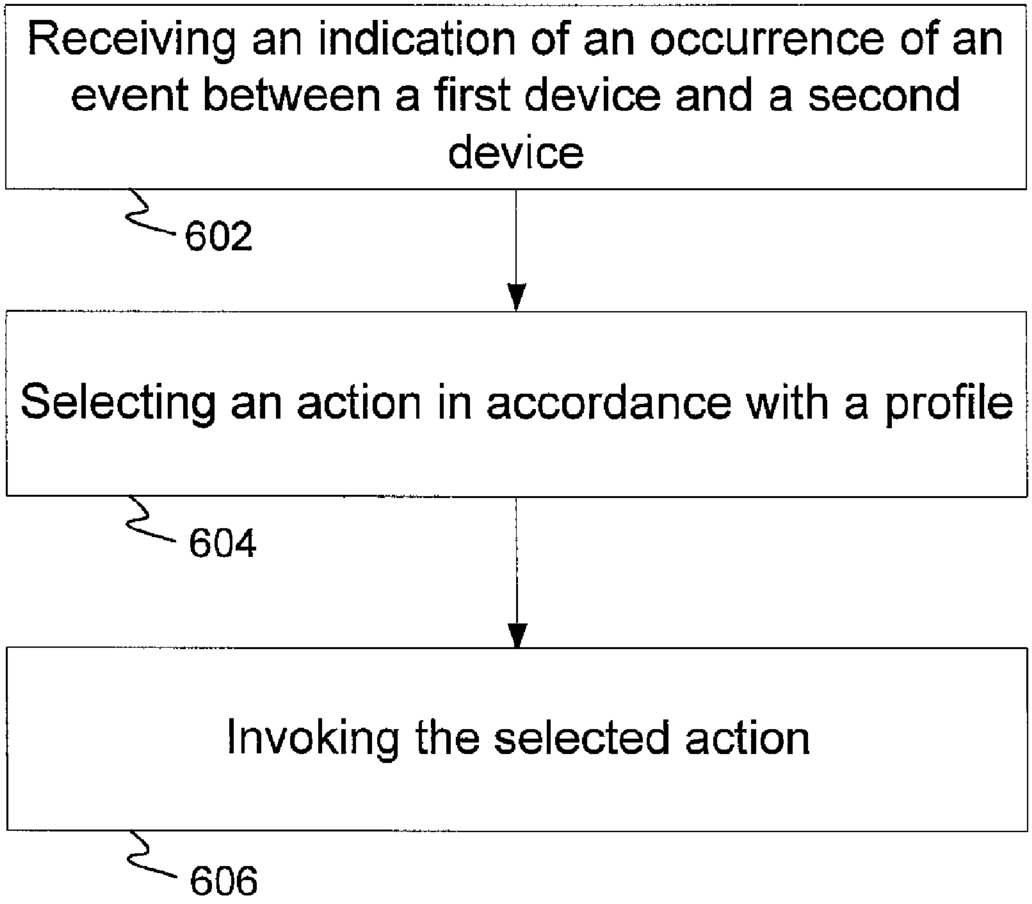
FIG. 6 depicts a flow diagram of an example security process for protecting wireless communications devices.

The datastore may store thereon user data 512. The user data 512 may include contact information, e-mail data, spreadsheets, word processing data, task data, and/or the like. In an embodiment, the processor may invoke an action to delete and/or encrypt the user data 512. The user data 512 may be encrypted with a randomly, dynamically generated encryption key. The processor may delete the user data 512 to prevent from being exposed and or compromised. The processor may communicate via the wireless communications portion the randomly, dynamically generated encryption key FIG. 6 depicts a flow diagram of an example security process for protecting wireless communications devices. The security process may invoke an action in response to an occurrence of an event.

At 602, a first indication of an occurrence of an event between a first device of a plurality of devices and a second device of the plurality of devices may be received. The plurality of devices may be in communication with each other. For example, the plurality of devices may be in communication in accordance with the BLUETOOTH® protocol. In an embodiment, each of the plurality of devices may be in direct radio frequency communication at least one other of the plurality of devices. For example, the first indication of the event may include a first value of received signal strength of point-to-point wireless communications being less than a second predetermined received signal strength. For example, the first indication of the event may include a first value of distance between the first device and the second device exceeding a second predetermined value of distance. For example, the first indication of the event may include receiving a message from the second device.

At 604, an action may be selected in accordance with a profile comprising a relationship between the first and second devices, data indicative of the event, and the action associated with the relationship and the data indicative of the event. The action may include disabling a function of at least one of the plurality of devices. The action may include locking a user interface of at least one of the plurality of devices. The action may include obfuscating user data stored on any of the plurality of devices. The action may include sending a message to a user and/or sounding an audible alarm at any of the plurality of devices. In an embodiment, a random encryption key may be generated and the action may include encrypting user data stored on the any of the plurality of devices with the random encryption key and communicating the random encryption key to a server.

At 606, the at least one predetermined action may be invoked in response to the first indication. In an embodiment, in addition to the relationship between the first and second device and the type of event, the at least one predetermined action may be determined in accordance with a type of exception. An indication of an exception having occurred may be received and the type of exception may include an authorized shut-down of the second device. For example, where an exception has occurred, the selected action may include notifying the user.

What is claimed is:

1. A method comprising:

monitoring, at a wireless communications device, a first value of received signal strength of first point-to-point wireless communications with a first device;

determining, at the wireless communications device, that the first value of received signal strength is below a first predetermined value of received signal strength; and responsive to determining that the first value of received signal strength is below the first predetermined value of received signal strength, the wireless communications device locking first user interface of the wireless communications device and directing a second device to lock a second user interface of the second device, wherein the second device is in second point-to-point wireless communications with the wireless communications device.

2. The method of claim 1, further comprising:

monitoring, at the wireless communications device, a second value of received signal strength of the second point-to-point wireless communications.

3. The method of claim 2, further comprising determining, at the wireless communications device, that the second value of received signal strength is below a second predetermined value of received signal strength.

4. The method of claim 1, wherein the first device and the second device communicate via point-to-point wireless communication.

5. The method of claim 1, wherein the first device and the wireless communications device communicate using a short range wireless protocol.

6. The method of claim 1, further comprising transmitting location coordinates to at least one of a network device, the first device, and the second device.

7. The method of claim 1, further comprising:

receiving an override code at the wireless communications device; and responsive to receiving the override code, unlocking the first user interface of the wireless communications device.

8. The method of claim 1, further comprising determining that the the first value of received signal strength being below the first predetermined value of received signal strength is not an exception.

9. The method of claim 3, further comprising determining that the second value of received signal strength being below the second predetermined value of received signal strength is an exception.

10. The method of claim 9, further comprising, responsive to determining that the second value of received signal strength being below the second predetermined value of received signal strength is an exception, communicating the exception to at least one other device.

11. The method of claim 1, wherein directing the second device to lock the second user interface of the second device comprises sending a message to the second device, and wherein the message relates to the first value of received signal strength.

12. The method of claim 7, wherein the override code comprises a predefined personal identification number.

13. The method of claim 1, further comprising the wireless communications device generating an alarm responsive to determining that the first value of received signal strength is below the first predetermined value of received signal strength.

14. The method of claim 1, further comprising the wireless communications device transmitting an indication of the first value of received signal strength being below the first predetermined value of received signal strength to at least one other device.

15. The method of claim 1, further comprising, responsive to determining that the first value of received signal strength is below the first predetermined value of received signal strength, the wireless communications device disabling communications with a network.

16. The method of claim 1, further comprising the wireless communications device, responsive to determining that the first value of received signal strength is below the first predetermined value of received signal strength, obfuscating at least a portion of data stored in the wireless communications device.

17. The method of claim 1, further comprising the wireless communications device, responsive to determining that the first value of received signal strength is below the first predetermined value of received signal strength, determining to transmit an indication of the first value of received signal strength being below the first predetermined value of received signal strength based on a first profile stored at the wireless communications device.

18. The method of claim 1, further comprising responsive to determining that the first value of received signal strength is below the first predetermined value of received signal strength, deleting at least a portion of data stored in the wireless communications device.

19. A wireless communications device comprising:

a processing portion configured to:

monitor a first value of received signal strength of first point-to-point wireless communications with a first device, determine that the first value of received signal strength is below a predetermined second value of received signal strength, and responsive to determining that the first value of received signal strength is below the predetermined second value of received signal strength, lock a first user interface of the wireless communications device; and a wireless communications portion configured to:

transmit an indication of the determination that the first value of received signal strength is below the predetermined second value of received signal strength to a second device, wherein the indication causes the second device to lock a second user interface of the second device, wherein the second device is in second point-to-point wireless communications with the wireless communications device.

20. The device of claim 19, wherein the processing portion is further configured to monitor a second value of received signal strength of the second point-to-point wireless communications.

21. The device of claim 20, wherein the processing portion is further configured to determine that the second value of received signal strength is below a second predetermined value of received signal strength.

22. The device of claim 21, wherein the processing portion is further configured to determine that the second value of received signal strength being below the second predetermined value of received signal strength is an exception.

23. A system comprising;

a wireless communications device having a user interface;

a first device in first point-to-point wireless communications with the wireless communications device; wherein the wireless communications device monitors a first value of received signal strength of the point-to-point wireless communication and, when the first value is less than a predetermined second value of received signal strength, locks the user interface; and a second device having a second user interface, wherein the second device is in second point-to-point wireless communication with the wireless communications device, and wherein, when the first value is less than the predetermined second value of received signal strength, the wireless communications device directs the second device to lock the second user interface.

24. The system of claim 23, further comprising the wireless communications device generating an alarm when the first value is less than the predetermined second value of received signal strength.

25. The system of claim 23, wherein:

the wireless communications device comprises a cellular telephone.

* * * * *

UNITED STATES PATENT AND TRADEMARK OFFICE

CERTIFICATE OF CORRECTION

PATENT NO. : 8,140,012 B1
APPLICATION NO. : 11/924065
DATED : March 20, 2012
INVENTOR(S) : Mark Edward Causey et al.

It is certified that error appears in the above-identified patent and that said Letters Patent is hereby corrected as shown below:

<u>Column 17</u>,
Line 5, delete "the" (second occurrence).

Signed and Sealed this
Twelfth Day of June, 2012

David J. Kappos
*Director of the United States Patent and Trademark Office*